United States Patent [19]
Fuller

[11] Patent Number: 5,778,168
[45] Date of Patent: Jul. 7, 1998

[54] TRANSACTION DEVICE DRIVER TECHNIQUE FOR A JOURNALING FILE SYSTEM TO ENSURE ATOMICITY OF WRITE OPERATIONS TO A COMPUTER MASS STORAGE DEVICE

[75] Inventor: Billy J. Fuller, Colorado Springs, Colo.

[73] Assignee: Sun Microsystems, Inc., Palo Alto, Calif.

[21] Appl. No.: 526,380

[22] Filed: Sep. 11, 1995

[51] Int. Cl.$^6$ .................................................. G06F 11/00
[52] U.S. Cl. .................................................. 395/182.16
[58] Field of Search .................. 395/182.16, 182.17, 395/280, 427, 616; 371/20.1, 20.2, 40.1; 364/268.9, 285.3, 945, 945.2, 962; 902/22, 38, 40

[56] References Cited

U.S. PATENT DOCUMENTS

| | | | |
|---|---|---|---|
| 4,498,145 | 2/1985 | Baker et al. | 364/900 |
| 4,949,251 | 8/1990 | Griffin et al. | 364/200 |
| 5,201,044 | 4/1993 | Frey, Jr. et al. | 395/575 |
| 5,222,217 | 6/1993 | Blount et al. | 395/325 |
| 5,369,757 | 11/1994 | Spiro et al. | 395/575 |
| 5,386,554 | 1/1995 | Nozaki | 395/600 |
| 5,414,840 | 5/1995 | Rengarajan et al. | 395/600 |
| 5,435,004 | 7/1995 | Cox et al. | 395/575 |
| 5,455,946 | 10/1995 | Mohan et al. | 395/600 |
| 5,469,562 | 11/1995 | Saether | 395/182.18 |
| 5,481,699 | 1/1996 | Saether | 395/182.13 |

FOREIGN PATENT DOCUMENTS 0 550 372 A2   7/1993   European Pat. Off. ...... G06F 15/403

OTHER PUBLICATIONS

Gait, "Optimizing Unix Database File Operations", IEEE Software, vol. 1, Iss 3, pp. 48–56, May 1994.

Stamos et al., "A Low–Cost Atomic Commit Protocol", Reliable Distributed Systems, 1990 9$^{th}$ Symposium, pp. 66–75, 1990.

Cabera et al., "Implementing Atomicity in Two Systems: Techniques, Tradeoffs, and Experience", IEEE Trans. on Software Eng., vol. 19, No. 10, pp. 950–961, Oct. 1993.

Rusinkiewicz et al., "Transaction Management in a Distributed Database System for Local Area Networks", Reliable Distributed Systems, 1988 7$^{th}$ Symposium, pp. 177–182, 1988.

Araki et al., "A Non–Stop Updating Technique for Device Driver Programs on the IROS Platform", IEEE, pp. 88–92, 1995 Intl' Conf on Communications.

Popek et al., "Replication in Ficus Distributed File Systems", IEEE, pp. 5–10, Proceedings–Management of Replicated Data.

Definition of "Metadevice" from Network Glossary at www.clock.org/njss/glossary/index.Intnl, no date.

*Primary Examiner*—Robert W. Beausoliel, Jr.
*Assistant Examiner*—Stephen C. Elmore
*Attorney, Agent, or Firm*—William J. Kubida; Stuart T. Langley; Holland & Hart LLP

[57] ABSTRACT

A transaction device driver that exports a transaction interface tailored to the requirements of conventional journaling file systems. The operating system file system informs the transaction device driver when a file system operation begins and ends and also informs the transaction driver about important data updates which have occurred since the beginning of the file system operation. The transaction device driver logs the updates as the data appears through the normal read/write/strategy entry points into the driver and, should the system fail while there are outstanding operations, ensures that either all of the changes for the operation will appear in the file system or that none of the changes will appear.

14 Claims, 9 Drawing Sheets

TRANSACTION DEVICE DRIVER TECHNIQUE FOR A JOURNALING FILE SYSTEM TO ENSURE ATOMICITY OF WRITE OPERATIONS TO A COMPUTER MASS STORAGE DEVICE

CROSS REFERENCE TO RELATED APPLICATIONS

The present invention is related to the subject matter of copending patent application Ser. No. 08/526,790 filed on even date herewith for: "Single Transaction Technique For a Journaling File System of a Computer Operating System", assigned to Sun Microsystems, Inc., Mountain View, Calif., assignee of the present invention, the disclosure of which is hereby specifically incorporated by this reference.

BACKGROUND OF THE INVENTION

The present invention relates, in general, to the field of file systems ("FS") of computer operating systems ("OS"). More particularly, the present invention relates to a transaction device driver for a journaling file system to ensure atomicity of write operations to a computer mass storage device in the event of system failure.

Because computer mass storage devices, such as disk drives, cannot guarantee atomicity of data if a system failure should occur during a "write" operation, conventional journaling file systems must use complex transaction mechanisms to compensate. A system failure during a disk write operation usually results in a non-deterministic mix of old and new data having been written to the disk and then subsequently encountered at reboot of the computer system. Consequently, it would be highly desirable if atomicity of data could be guaranteed without the necessity of implementing various complex transaction mechanisms.

SUMMARY OF THE INVENTION

The transaction device driver technique for a journaling file system of the present invention is of a special utility in ensuring atomicity of write operations to a computer mass storage device in the event of system failure by exporting a transaction interface tailored to the requirements of conventional journaling file systems. In a particular embodiment disclosed herein, the OS file system informs the transaction device driver when a file system operation begins and ends. During the operation, the file system also informs the transaction driver about important data updates that have occurred since the beginning of the file system operation. The transaction device driver herein disclosed logs the updates as the data appears through the normal read/write/strategy entry points into the driver.

Should the system fail while there are outstanding operations, the transaction device driver then ensures that either all of the changes for the operation will appear in the file system or that none of the changes will appear. Consequently, the data written to the disk and encountered at reboot will either be all new data or all old data with no non-deterministic mixing of the two.

Among the benefits of the transaction device driver disclosed herein is that the journaling functionality disclosed may be readily added to any UNIX® or related OS file system with existing code paths remaining intact with but a few calls to the transaction device driver. Moreover, in a particular embodiment, the additional transaction code is relatively localized to enhance maintenance and test functions. In addition, no new interactions are introduced between the file system subsystem, virtual memory subsystem and the disk-buffer cache subsystem thus increasing performance, stability and maintainability. Finally, the utilities that operate on the file system may remain unchanged. Without the transaction device driver of the present invention, conventional utilities such as file system check ("fsck"), "dump" and "quotacheck" would have to process both the file system and the file system's journal, or log.

The present invention is implemented, in part, by adding a journal, or log, to the OS file system including any System V-based UNIX® OS incorporating a Unix File System (UFS) layer or equivalent, the IBM AIX® or Microsoft Windows NT™ operating systems. The journal contains sequences of file system updates grouped into atomic transactions and is managed by a new type of metadevice, the metatrans device. The addition of a journal to the operating system provides faster reboots and fast synchronous writes (e.g. network file system ("NFS"), O_SYNC and directory updates).

In the specific embodiment disclosed herein, the present invention is advantageously implemented as an extension to the UFS file system that provides faster synchronous operations and faster reboots through the use of a log. File system updates are safely recorded in the log before they are applied to the file system itself. The design may be implemented into corresponding upper and lower layers. At the upper layer, the UFS file system is modified with calls to the lower layer that record file system updates. The lower layer consists of a pseudo-device, the metatrans device and it is responsible for managing the contents of the log.

The metatrans device is composed of two subdevices, the logging device, and the master device. The logging device contains the log of file system updates, while the master device contains the file system itself. The existence of a separate logging device is invisible to user program code and to most of the kernel. The metatrans device presents conventional block and raw interfaces and behaves like an ordinary disk device.

Utilizing conventional OS approaches, file systems must be checked before they can be used because shutting down the system may interrupt system calls that are in progress and thereby introduce inconsistencies. Mounting a file system without first checking it and repairing any inconsistencies can cause "panics" or data corruption. Checking is a relatively slow operation for large file systems because it requires reading and verifying the file system metadata. Utilizing the present invention, file systems do not have to be checked at boot time because the changes from unfinished system calls are discarded. As a result, it is ensured that on-disk file system data structures will always remain consistent, that is, that they do not contain invalid addresses or values. The only exception is that free space may be lost temporarily if the system crashes while there are open but unlinked files without directory entries. A kernel thread eventually reclaims this space.

The present invention also improves synchronous write performance by reducing the number of write operations and eliminating disk seek time. Writes are smaller because deltas are recorded in the log rather than rewriting whole file system blocks. Moreover, there are fewer of the blocks because related updates are grouped together into a single write operation. Disk seek time is significantly reduced because writes to the log are sequential.

As described herein with respect to a specific embodiment of the present invention, UFS on-disk format may be retained, no changes are required to add logging to an existing UFS file system and the log can subsequently be removed to return to standard UFS. Moreover, UFS utilities continue to operate as before and file systems do not have to be checked for consistency at boot time. The driver must scan the log and rebuild its internal state to reflect any completed transactions recorded there. The time spent scanning the log depends on the size of the log device but not on the size of the file system. For reasonably foreseeable configuration choices, scan times on the average of 1–10 seconds per gigabyte of file system capacity may be encountered.

NFS writes and writes to files opened with O_SYNC are faster because file system updates are grouped together and written sequentially to the logging device. This means fewer writes and greatly reduced seek time. Significantly improved speed-up may be expected at a cost of approximately 50% higher central processor unit ("CPU") overhead. Also, NFS directory operations are faster because file system updates are grouped together and written sequentially to the logging device. Local operations are also faster because the logging of updates may optionally be delayed until synco(), fsync(), or a synchronous file system operation. If no logging device is present, directory operations may be completed synchronously, as usual.

If a power failure occurs while a write to the master or logging device is in progress, the contents of the last disk sector written is unpredictable and may even be unreadable. The log of the present invention is designed so that no file system metadata is lost under these circumstances. That is, the file system remains consistent in the face of power failures. In the specific embodiment described in detail herein, users may set up and administer the metatrans device using standard magnetic disk driver (MDD) utilities while the metainit(1m), metaparam(1m), and metastat(1m) commands have small extensions. Use is therefore simplified because there are no new interfaces to learn and the master device and logging device together behave like a single disk device. Moreover, more than one UFS file system can concurrently use the same logging device. This simplifies system administration in some situations.

In conventional UFS implementations, the file system occupies a disk partition and the file system code performs updates by issuing read and write commands to the device driver for the disk. With the extension of the present invention, file system information may be stored in a logical device called a metatrans device, in which case the kernel communicates with the metatrans driver instead of a disk driver. Existing UFS file systems and devices may continue to be used without change.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 6 is a further simplified logical block diagram showing that the logmap contains a mapentry_t for every delta in the log that needs to be rolled to the master device and the map entries are hashed by (metatrans dev, metatrans device offset) and maintained on a linked list in the order that they should be rolled in;

DESCRIPTION OF A PREFERRED EMBODIMENT

Figure 1:
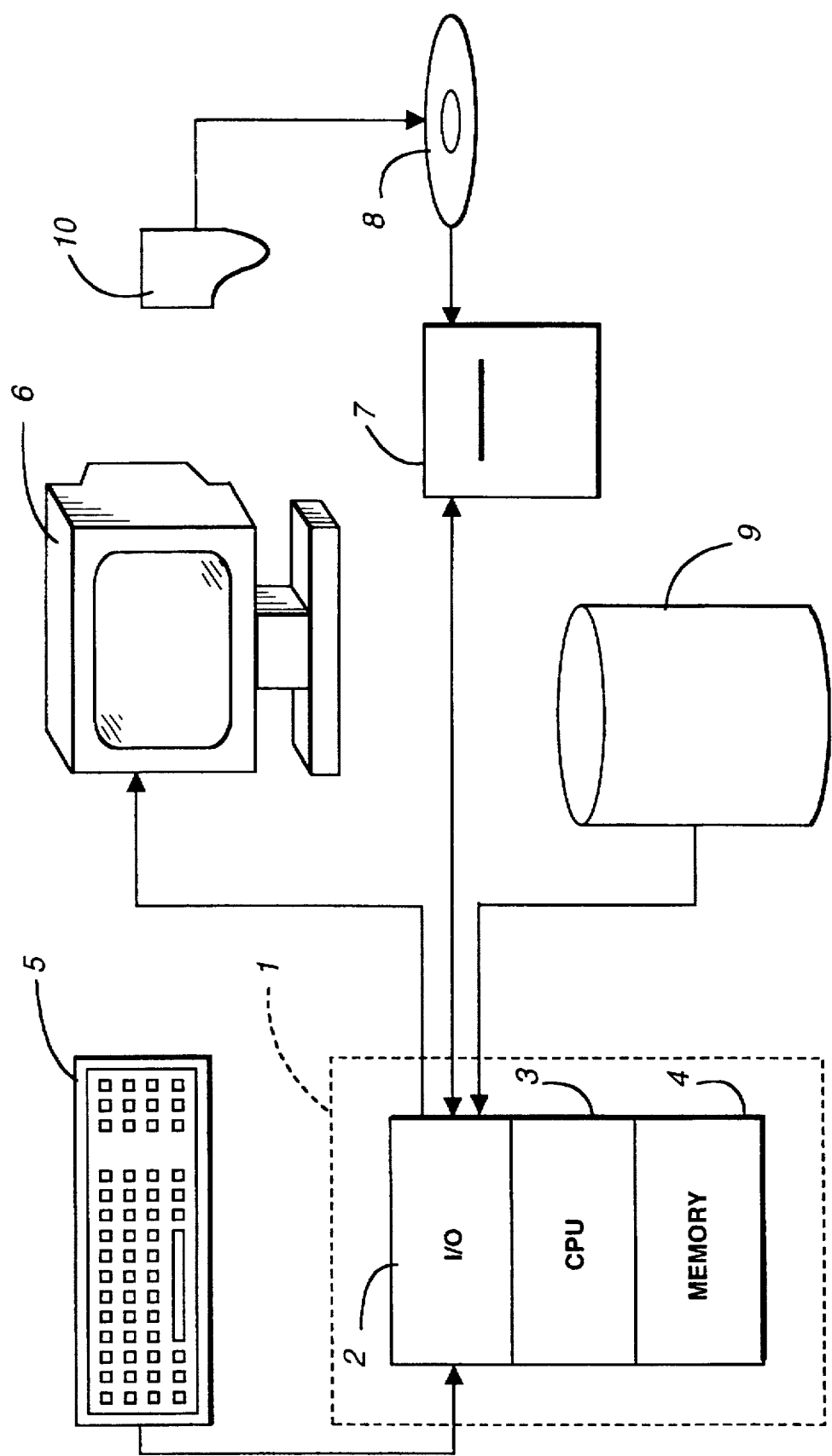
FIG. 1 is a simplified representational drawing of a general purpose computer forming a portion of the operating environment of the present invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 is connected to a keyboard 5, a display unit 6, a disk storage unit 9 and a compact disk read only memory ("CDROM") drive unit 7. The CDROM unit 7 can read a CDROM medium 8 which typically contains programs 11 and data. The computer program products containing mechanisms to effectuate the apparatus and methods of the present invention may reside in the memory section 4, or on a disk storage unit 9 or on the CDROM 8 of such a system.

Figure 2:
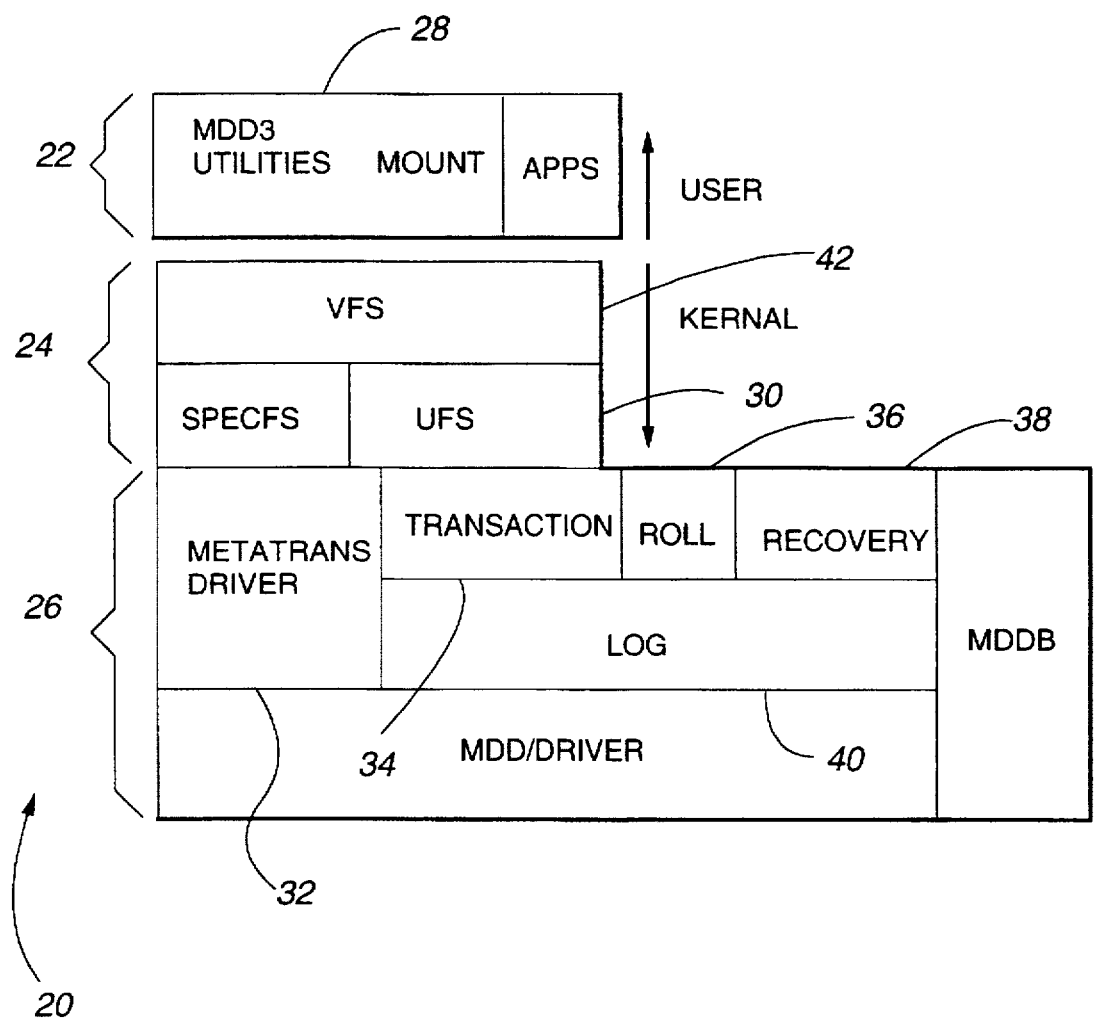
FIG. 2 is a simplified representational illustration providing an architectural overview of how selected elements of the computer program for effectuating a representative implementation of the present invention interact with the various layers and interfaces of a computer operating system.

With reference now to FIG. 2, a simplified representational view of the architecture 20 for implementing the present invention is shown in conjunction with, for example, a System V-based UNIX operating system having a user (or system call) layer 22 and a kernel 24. With modifications to portions of the user layer 22 (i.e. the MDD3 and mount utilities 28) and kernel 24 (i.e. the UFS layer 30) as will be more fully described hereinafter, the present invention is implemented primarily by additions to the metatrans layer 26 in the form of a metatrans driver 32, transaction layer 34, roll code 36, recovery code 38 and an associated log (or journal) code 40.

The MDD3 Utilities administer the metatrans driver 32 and set up, tear down and give its status. The mount utilities include a new feature ("-syncdir") which disables the delayed directory updates feature. The UFS layer 30 interfaces with the metatrans driver 32 at mount, unmount and when servicing file system system calls. The primary metatrans driver 32 interfaces with the base MDD3 driver and the transaction layer 34 interfaces with the primary metatrans driver 32 and with the UFS layer 30. The roll code 36 rolls completed transactions to the master device and also satisfies a read request by combining data from the various pieces of the metatrans driver 32. The recovery code scans the log and rebuilds the log map as will be more fully described hereinafter while the log code presents the upper layers of the operating system with a byte stream device and detects partial disk drive write operations.

Figure 3:
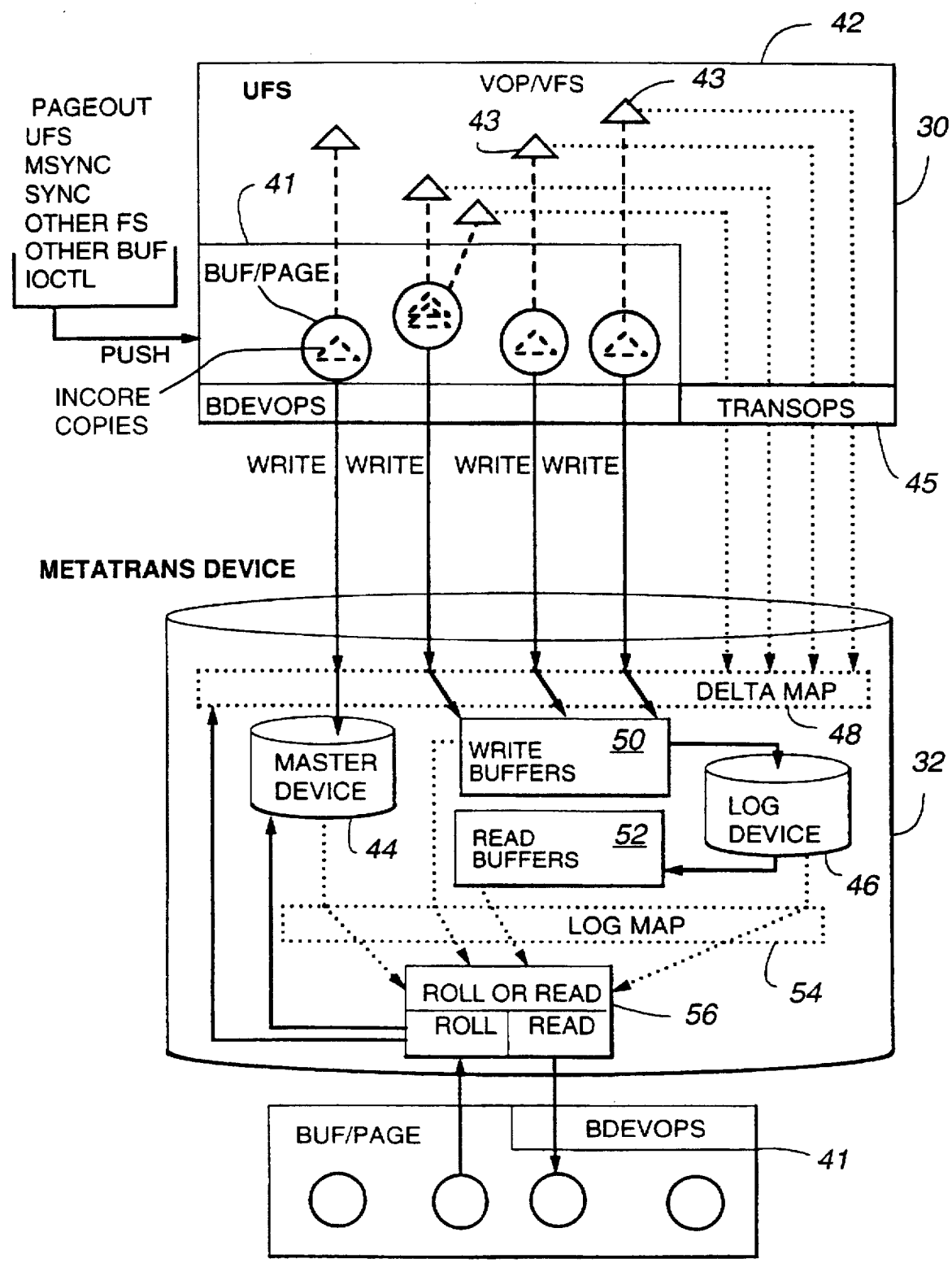
FIG. 3 is a more detailed representative illustration of the major functional components of the computer program of FIG. 2 showing in greater detail the components of the metatrans device and its interaction through the VOP or Virtual file system (VFS) interface of a System V-based computer operating system in accordance with the exemplary embodiment hereinafter described.

With reference additionally now to FIG. 3, the major components of the architecture of the present invention is shown in greater detail. The UFS layer 30 is entered via the VOP or VFS interface 42. The UFS layer 30 changes the file system by altering incore copies (represented by dashed triangles in FIG. 3 of the file system's data. The incore copies are kept in buffer or page cache locations (indicated by circles) inside the buffer or page cache 41. The changes to the incore copies are called deltas 43. UFS tells the metatrans driver 32 which deltas 43 are important by using the transops interface 45 as suggested by the dotted lines with arrowheads extending from important ones of deltas 43 through transops interface 45 to the metatrans device 32.

The UFS layer does not force a write after each delta 43. This would be a significant performance loss. Instead, the altered buffers and pages are pushed by normal system activity or by UFS 30 at the end of the VOP or VFS interface 42 call that caused the deltas 43. As depicted schematically, the metatrans driver 32 looks like a single disk device to the upper layers of the kernel 24. Internally, the metatrans driver 32 is composed of two disk devices, the master and log devices 44, 46. Writes to the metatrans device 32 are either passed to the master device 44 via bdev_strategy or, if deltas 43 have been recorded against the request via BDE-VOPS according to a the transops interface 45, then the altered portions of the data are copied into a write buffer 50 and assigned log space and the request is biodone'ed. The deltas 43 are moved from the delta map 48 to the log map 54 in this process.

The write buffer 50 is written to the log device 46 when UFS 30 issues a commit (not shown) at the end of a VOP or VFS interface 42 call or when the write buffer 50 fills. Not every VOP or VFS layer 42 call issues a commit. Some transactions, such as lookups or writes to files *not* opened O_SYNC, simply collect in the write buffer 50 as a single transaction.

Reading the metatrans device 32 is somewhat complex because the data for the read can come from any combination of the write buffers 50, read buffers 52, master device 44, and log device 46. Rolling the data from the committed deltas 43 forward to the master device 44 appears generally as a "read" followed by a "write" to the master device 44. The difference is that data can also come from the buffer or page caches 41. The affected deltas 43 are removed from the log map 54. The roll/read code block 56 is coupled to the master and log devices 44, 46 as well as the write and read buffers 50, 52 and interfaces to the buffer or page cache 41 having a plurality of buffer or page cache locations indicated by circles. For ease of illustration, buffer or page cache 41 is duplicated at the bottom of FIG. 3, however, it should be understood that a single buffer or page cache 41 is used in UFS 30.

Figure 4:
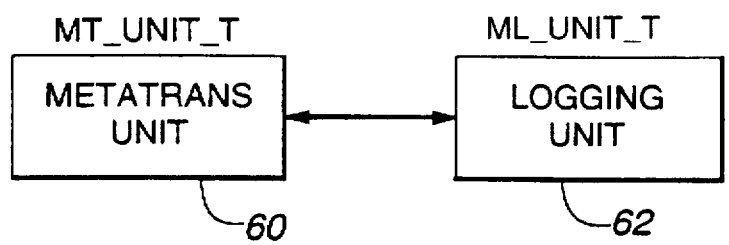
FIG. 4 is a simplified logical block diagram illustrative of the fact that the unit structure for the metatrans devices contains the address of the logging device unit structure and vice versa.

With reference now to FIG. 4, it can be seen that early in the boot process, the On-line: Disksuite ("ODS") state databases are scanned and the incore state for the metadevices is re-created. Each metadevice is represented by a unit structure and the unit structure for the metatrans devices contains the address of its logging device unit structure, and vice versa. The metatrans device 60 unit structure is mt_unit_t and is defined in md_trans.h. The logging device 62 unit structure is ml_unit_t and is also defined in md_trans.h.

Figure 5:
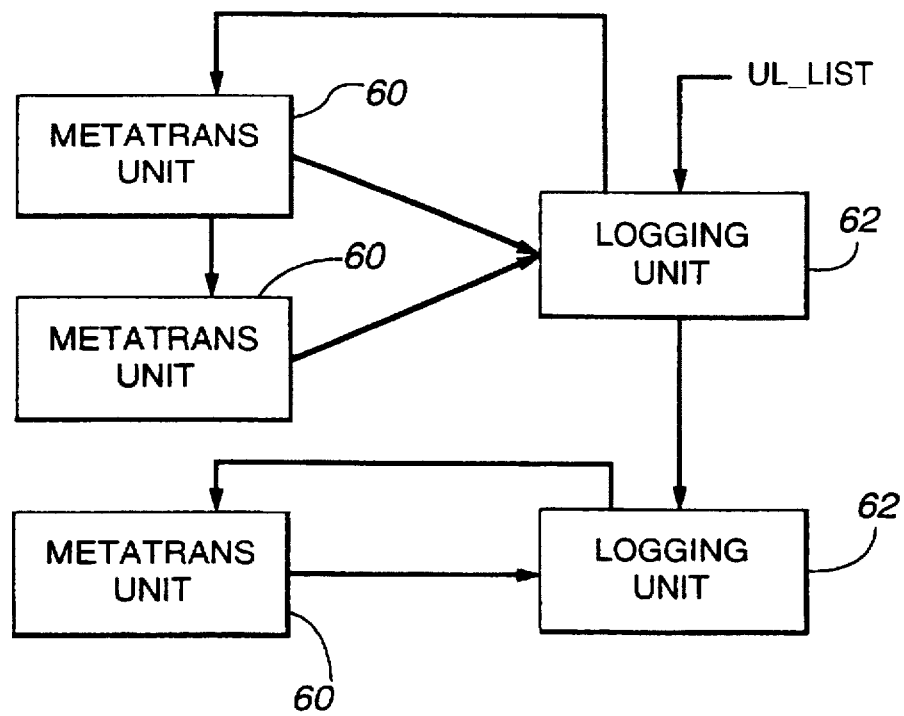
FIG. 5 is an additional simplified logical block diagram illustrative of the fact that the logging device's unit structures are maintained on a global linked list anchored by ul_list and that each of the metatrans unit structures for the metatrans devices sharing a logging device are maintained on a linked list anchored by the logging device's unit structure.

Referring additionally now to FIG. 5, the logging device 62 unit structures are maintained on a global linked list anchored by ul_list. Each of the metatrans device 60 unit structures for the metatrans devices 60 sharing a logging device 62 are kept on a linked list anchored by the logging device's unit structure.

Figure 6:
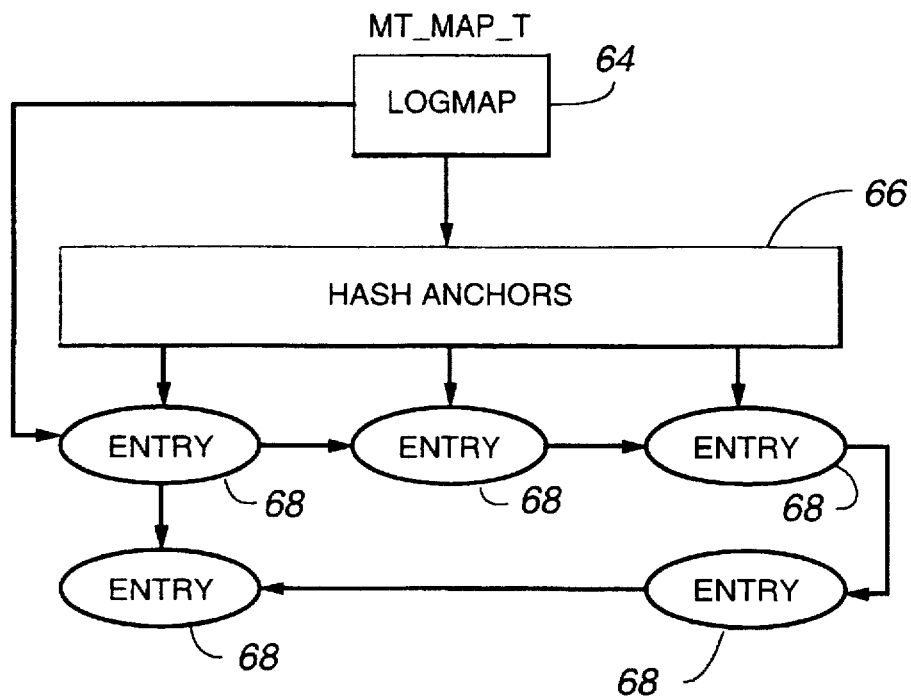
Figure 7:
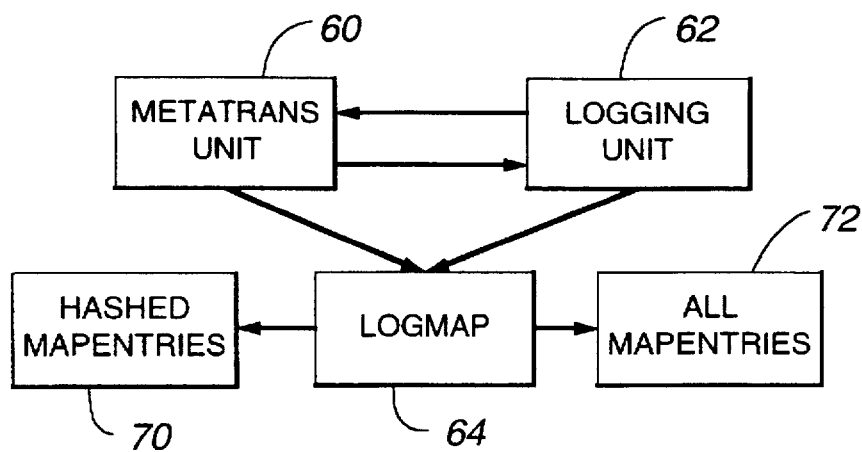
FIG. 7 is a simplified logical block diagram showing that the unit structures for the metatrans device and the logging device contain the address for the logmap.

With reference additionally to FIG. 6, after the unit structures are set up, a scan thread is started for each logging device 62. The scan thread is a kernel thread that scans a log device 62 and rebuilds the logmap 64 for that logging device 62. The logmap 64 is mt_map_t and is defined in mid_trans.h. The logmap 64 contains a mapentry_t for every delta 43 in the log that needs to be rolled to the master device. The map entries 68 are hashed by the hash anchors 66 (metatrans device, metatrans device offset) for fast lookups during read operations. In order to enhance performance, the map entries 68 are also maintained on a linked list in the order in which they should be rolled in. As shown schematically in FIG. 7, the unit structures for the metatrans device 60 and the logging device 62 contain the address of the logmap 64 (log map 54 in FIG. 3), which is associated with the hashed mapentries 70 and all mapentries 72.

Figure 8:
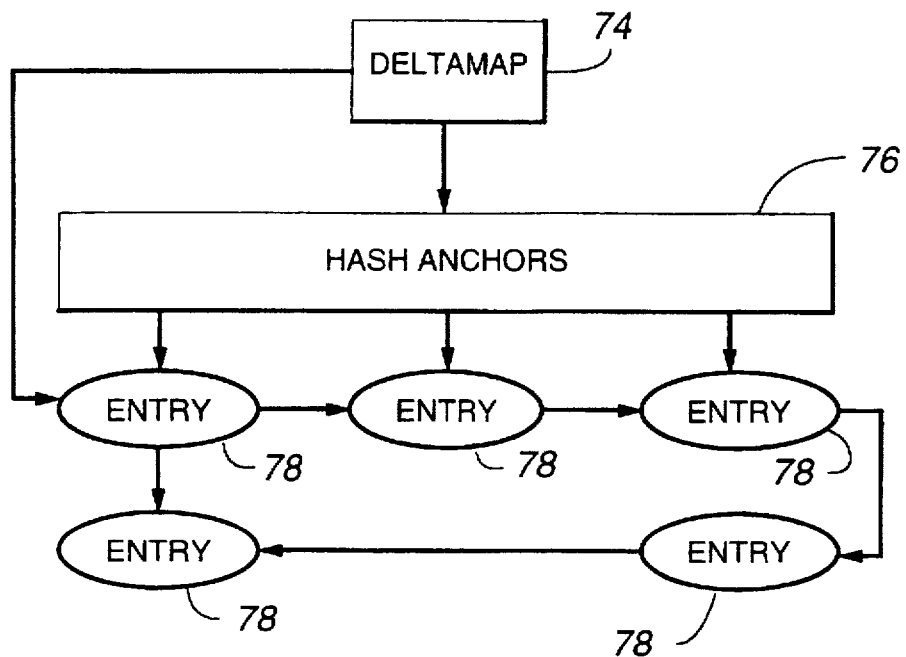
FIG. 8 is an additional simplified logical block diagram illustrative of the fact that a deltamap is associated with each metatrans device and stores the information regarding the changes that comprise a file system operation with the metatrans device creating a mapentry for each delta which is stored in the deltamap.

Referring also now to FIG. 8, a deltamap 74 is associated with each metatrans device 60. The deltamap 74 stores the information about the changes that comprise a file system operation. The file system informs the metatrans device 60 about this changes (or deltas 43) by recording the tuple (offset on master device 44, No. of bytes of data and callback) with the device. The metatrans device 60 in conjunction with hash anchors 76 creates a mapentry 78 for each delta 43 which is stored in the deltamap 74 (delta map 48 in FIG. 3). The deltamap 74 is an mt__map__t like the logmap 64 (FIGS. 6–7) and has the same structure.

Figure 9:
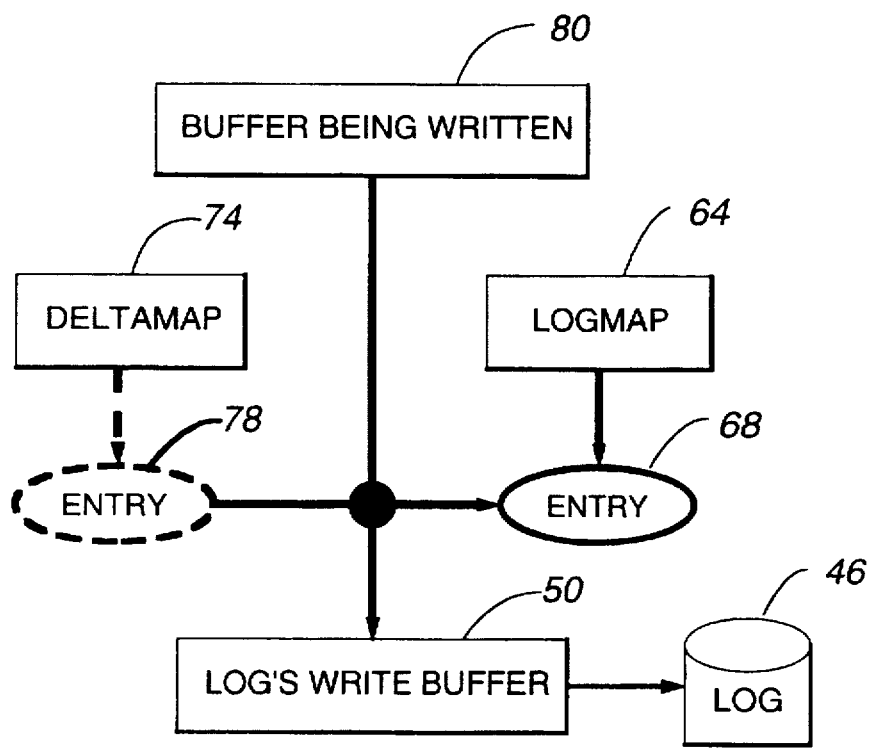
FIG. 9 is a further simplified logical block diagram showing that, at the end of a transaction, the callback recorded with each map entry is called and the logmap layer stores the delta plus data in the log's write buffer and puts the map entries into the logmap.

With reference also to FIG. 9, at the end of a transaction, the callback recorded with each map entry 68 is called in the case of "writes" involving logged data. The callback is a function in the file system that causes the data associated with a delta 43 to be written. When this "write" appears in the metatrans driver, the driver detects an overlap between the buffer being written 80 and deltas 43 in the deltamap 74. If there is no overlap, then the write is passed on to the master device 44 (FIG. 3). If an overlap is detected, then the overlapping map entries are removed from the deltamap 74 and passed down to the logmap layer.

The logmap layer stores the delta 43 + data in the log's write buffer 50 and puts the map entries into the logmap 64. It should be noted that the data for a delta 43 may have been written before the end of a transaction and, if so, the same process is followed. Once the data is copied into log's write buffer 50, then the buffer is iodone'ed.

Among the reasons for using the mt__map__t architecture for the deltamap 74 is that the driver cannot use kmem__alloc. The memory for each entry that may appear in the logmap needs to be allocated before the buffer appears in the driver. Since there is a one-to-one correspondence between deltas 43 in the deltamap 74 and the entries in the logmap 64, it is apparent that the deltamap entries 78 should be the same as the logmap entries 68.

Figure 10:
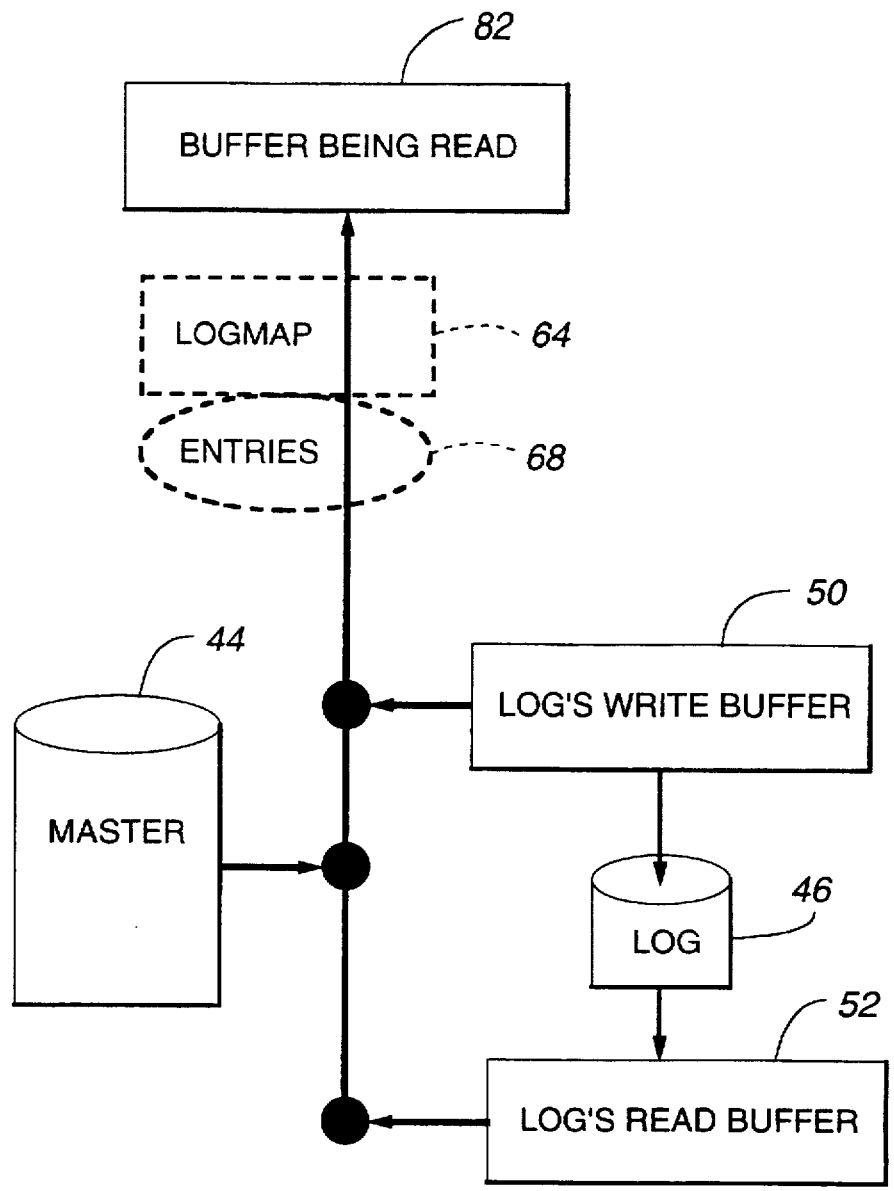
FIG. 10 is a simplified logical block diagram showing that the logmap is also used for read operations and, if the buffer being read does not overlap any of the entries in the logmap, then the read operation is passed down to the master device, otherwise, the data for the buffer is a combination of data from the master device and data from the logging device.

Referring now to FIG. 10, the analogous situation of "reads" involving logged data is illustrated. As can be seen, the logmap 64 is also used for read operations. If the buffer being read does not overlap any of the entries 68 in the logmap 64, then the "read" is simply passed down to the master device 44. On the other hand, if the buffer does overlap entries 68 in the logmap 64, then the data for the buffer is a combination of data from the master device 44 and data from the logging device 46.

Figure 11:
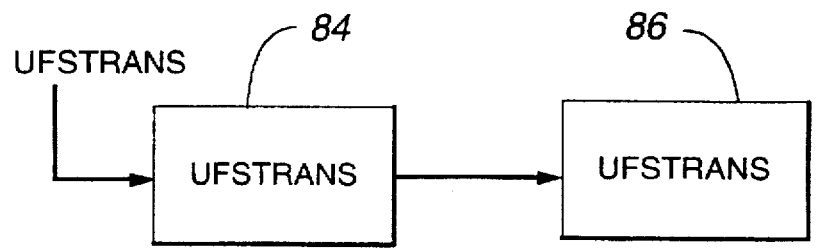
FIG. 11 illustrates that, early in the boot process, each metatrans device records itself with the UFS function, ufs_trans_set, creates a ufstrans struct and links it onto a global linked list.
Figure 12:
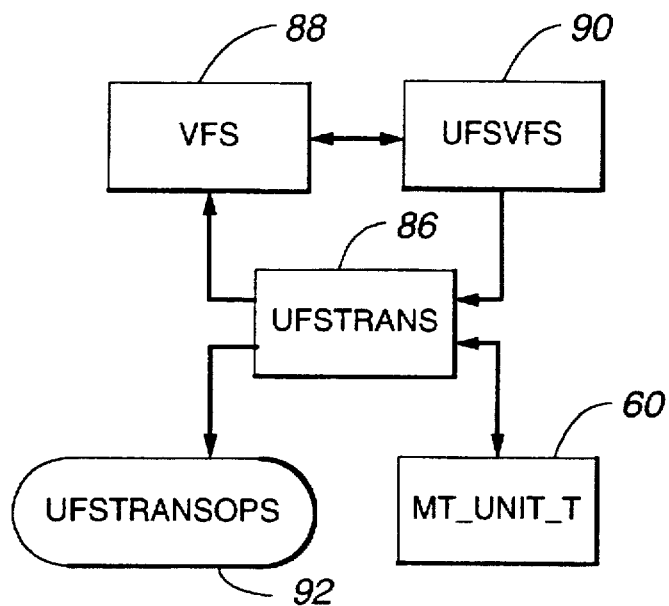
FIG. 12 further illustrates that, at mount time, the file system checks its dev_t against the other dev_t's stored in the ufstrans structs and, if there is a match, the file system stores the address of the ufstrans struct in its file system specific per-mount struct (ufsvfs) along with its generic per-mount struct (vfs) in the ufstrans struct.

With reference to FIGS. 11 and 12, the situation at mount time is illustrated schematically. Early in the boot process, each metatrans device records itself with the UFS function, ufs__trans__set and creates a ufstrans struct 84 and links it onto a global linked list. At mount time, the file system checks its dev__t against the dev__t's stored in the ufstrans structs 86. If there is a match, then the file system stores the address of the ufstrans struct 86 its file system specific per-mount struct, the ufsvfs 90. The file system also stores its generic per-mount struct, the vfs 88, in the ufstrans struct 86. This activity is accomplished by mountfs() and by uf s__trans__get(). The address of the vfs 88 is stored in the ufstrans struct 86 due to the fact that the address is required by various of the callback functions.

Figure 13:
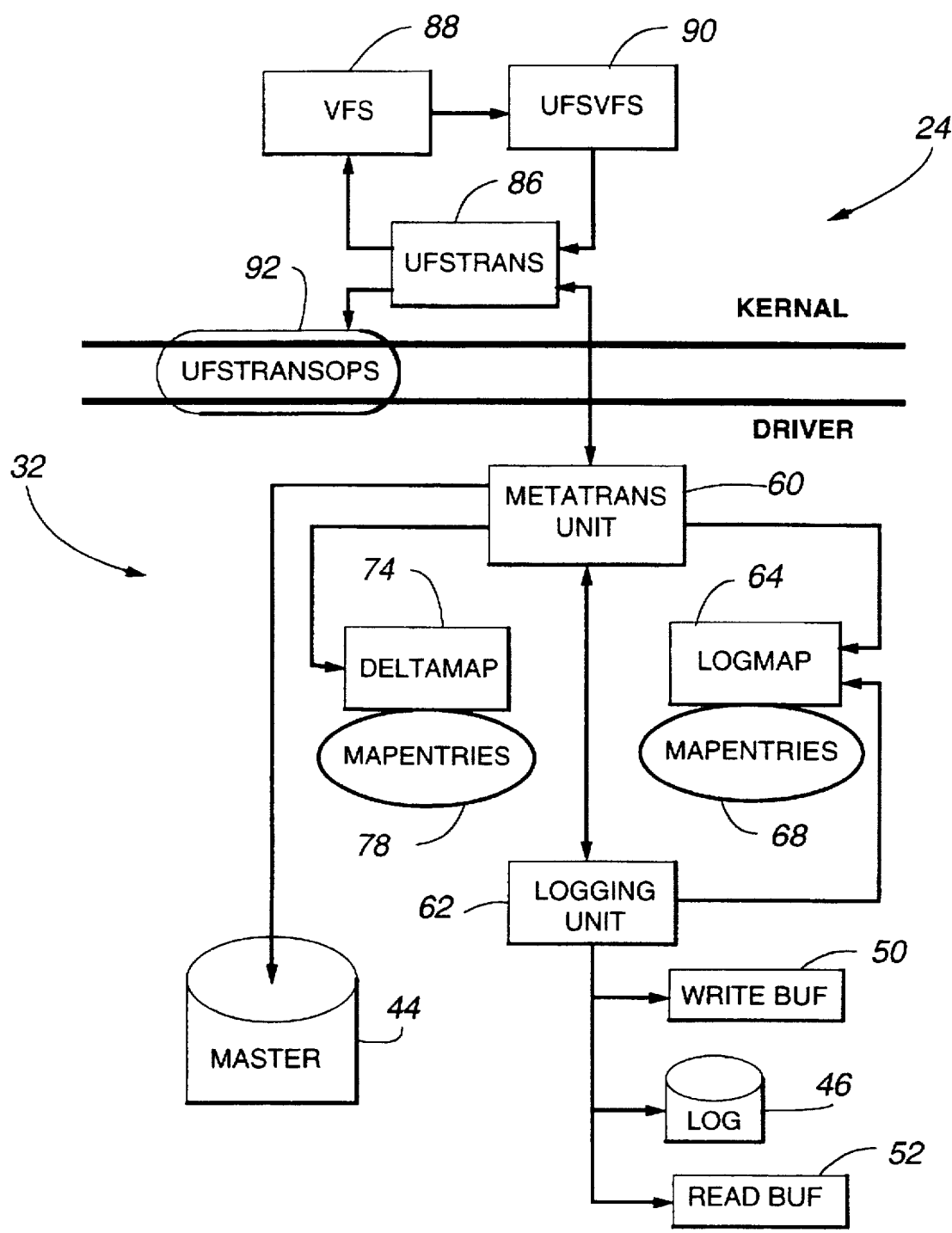
FIG. 13 is an additional illustration of the interface between the operating system kernel and the metatrans driver shown in the preceding figures showing that the file system communicates with the driver by calling entry points in the ufstransops struct, inclusive of the begin-operation, end-operation and record-delta functions.

The file system communicates with the metatrans driver 32 (FIGS. 2–3) by calling the entry points in the ufstransops 92 struct. These entry points include the begin-operation, end-operation and record-delta functions. Together, these three functions perform the bulk of the work needed for transacting UFS layer 30 operations. FIG. 13 provides a summary of the data structures of the present invention as depicted in the preceding figures and as will be more fully described hereinafter.

The metatrans device, or driver 32 contains two underlying devices, a logging device 46 and a master device 44. Both of these can be disk devices or metadevices (but not metatrans devices). Both are under control of the metatrans driver and should generally not be accessible directly by user programs or other parts of the system. The logging device 46 contains a journal, or log. The log is a sequence of records each of which describes a change to a file system (a delta 43). The set of deltas 43 corresponding to the currently active vnode operations form a transaction. When a transaction is complete, a commit record is placed in the log. If the system crashes, any uncommitted transactions contained in the log will be discarded on reboot. The log may also contain user data that has been written synchronously (for example, by NFS). Logging this data improves file system performance, but is not mandatory. If sufficient log space is not available user data may be written directly to the master device 44. The master device 44 contains a UFS file system in the standard format. If a device that already contains a file system is used as the master device 44, the file system contents will be preserved, so that upgrading from standard UFS to extension of the present invention is straightforward. The metatrans driver updates the master device 44 with completed transactions and user data. Metaclear(1m) dissolves the metatrans device 32, so that the master device 44 can again be used with standard UFS if desired.

The metatrans device 32 presents conventional raw and block interfaces and behaves like an ordinary disk device. A separate transaction interface allows the file system code to communicate file system updates to the driver. The contents of the device consist of the contents of the master device 44, modified by the deltas 43 recorded in the log.

Through the transaction interface, UFS informs the driver what data is changing in the current transaction (for instance, the inode modification time) and when the transaction is finished. The driver constructs log records containing the updated data and writes them to the log. When the log becomes sufficiently full, the driver rolls it forward. In order to reuse log space, the completed transactions recorded in the log must be applied to the master device 44. If the data modified by a transaction is available in a page or buffer in memory, the metatrans driver simply writes it to the master device 44. Otherwise, the data must be read from the metatrans device 32. The driver reads the original data from the master device 44, then reads the deltas 43 from the log and applies them before writing the updated data back to the master device 44. The effective caching of SunOS™ developed and licensed by Sun Microsystems, Inc., assignee of the present invention, makes the latter case occur only rarely and in most instances, the log is written sequentially and is not read at all.

UFS may also cancel previous deltas 43 because a subsequent operation has nullified their effect. This canceling is necessary when a block of metadata, for instance, an allocation block, is freed and subsequently reallocated as user data. Without canceling, updates to the old metadata might be erroneously applied to the user data.

The metatrans driver keeps track of the log's contents and manages its space. It maintains the data structures for transactions and deltas 43 and keeps a map that associates log records with locations on the master device 44. If the system crashes, these structures are reconstructed from the log the next time the device is used (but uncommitted transactions are ignored). The log format ensures that partially written records or unused log space cannot be mistaken for valid transaction information. A kernel thread is created to scan the log and rebuild the map on the first read or write on a metatrans device 32. Data transfers are suspended until the kernel thread completes, though driver operations not requiring I/O may proceed.

One of the principle benefits of the present invention is to protect metadata against corruption by power failure. This imposes a constraint on the contents of the log in the case when the metatrans driver is applying a delta 43 to the master device 44 when power fails. In this case, the file system object that is being updated may be partially written or even corrupted. The entire contents of the object from the log must still be recovered. To accomplish this, the driver guarantees that a copy of the object is in the log before the object is written to the master device 44.

The metatrans device 32 does not attempt to correct other types of media failure. For instance, a device error while writing or reading the logging device 46 puts the metatrans device 32 into an exception state. The metatrans device 32's state is kept in the MDD database. There are different exception states based on when the error occurs and the type of error.

Metatrans device 32 configuration may be performed using standard MDD utilities. The MDD dynamic concatenation feature allows dynamic expansion of both the master and logging devices 44, 46. The device configuration and other state information is stored in the MDD state database, which provides replication and persistence across reboots. The space required to store the information is relatively small, on the order of one disk sector per metatrans device 32.

In a particular implementation of the present invention, UFS checks whether a file system resides on a metatrans device 32 at mount time by calling ufs_trans_get(). If the file system is not on a metatrans device 32, this function returns NULL; otherwise, it returns a handle that identifies the metatrans device 32. This handle is saved in the mount structure for use in subsequent transaction operations. The functions TRANS_BEGIN() and TRANS_END() indicate the beginning and end of transactions. TRANS_DELTA() identifies a change to the file system that must be logged. TRANS_CANCEL() lets UFS indicate that previously logged deltas 43 should be canceled because a file system data structure is being recycled or discarded.

When the file system check ("fsck") utility is run on a file system in accordance with the present invention, it checks the file system's clean flag in the superblock and queries the file system device via an ioctl command. When both the superblock and device agree that the file system is on a metatrans device 32, and the device does not report any exception conditions, fsck is able to skip further checking. Otherwise, it checks the file system in a conventional manner.

When the "quotacheck" utility is run on a file system in accordance with the present invention, it checks the system's clean flag in the superblock and queries the file system device via an ioctl command. When both the superblock and device agree that the file system is on a metatrans device 32, and the device does not report any exception conditions, quotacheck doesn't have to rebuild the quota file. Otherwise, it rebuilds the quota file for the file system in a conventional manner.

The logging mechanism of the present invention ensures file system consistency, with the exception of lost free space. If there were open but deleted files (that is, not referred to by any directory entry) when the system went down, the file system resources claimed by these files will be temporarily lost. A kernel thread will reclaim these resources without interrupting service. As a performance optimization, a previously unused field in the file system's superblock, fs_sparecon[53], indicates whether any files of this kind exist. If desired, fsck can reclaim the lost space immediately and fs_sparecon[53] will be renamed fs_reclaim.

Directories may be changed by a local application or by a daemon running on behalf of a remote client in a client-server computer system. In the standard UFS implementation, both remote and local directory changes are made synchronously, that is, updates to a directory are written to the disk before the request returns to the application or daemon. Local directory operations are synchronous so that the file system can be automatically repaired at boot time. The NFS protocol requires synchronous directory operations. Using the technique of the present invention, remote directory changes are made synchronously but local directory changes are held in memory and are not written to the log until a sync(), fsync(), or a synchronous file system operation forces them out. As a result, local directory changes can be lost if the system crashes but the file system remains consistent. Local directory changes remain ordered.

Holding the local directory updates in memory greatly improves performance. This introduces a change in file system semantics, since completed directory operations may now disappear following a system crash. However, the old behavior is not mandated by any standard, and it is expected that few, if any, applications would be affected by the change. This feature is implemented in conventional file systems, such as Veritas, Episode, and the log-structured file system of Ousterhout and Mendelblum. Users can optionally revert back to synchronous local directory updates.

The MDD initialization utility, metainit(1m), may be extended to accept the configuration lines of the following form:

| | |
|---|---|
| mdNN | -t master log [-n] |
| mdNN | A metadevice name that will represent the metatrans device. |
| master | The master device; a metadevice or ordinary disk device. |
| log | The log device; a metadevice or ordinary disk device. The same log may be used in multiple metatrans devices, in which case it is shared among them. |

Metastat may also be extended to display the status of metatrans devices, with the following format:
  mdXX: metatrans device
    Master device:mdYY
    Logging device:mdZZ
    <state information>
  mdYY: metamirror, master device for mdXX
    <usual status>
  mdZZ: metamirror, logging device for mdXX
    <usual status>

Fsck decides whether to check systems based on the state of the clean flag. The specific implementation of the present invention described herein defines a new clean flag value, FSLOG. If the clean flag is FSLOG and the metatrans device 32 is not in an exception state, "fsck -m" exits with 0 and checking is skipped. Otherwise, the clean flag is handled in a conventional manner. Fsck checks the state of the metatrans device 32 with a project-private ioctl request. After successfully repairing a file system, fsck will issue a project-private iocti request that takes the metatrans device 32 out of the exception state.

If the clean flag is FSLOG and the metatrans device 32 is not in an exception state then quotacheck skips the file system. Otherwise, quotacheck rebuilds the quotafile in a conventional manner. Quotacheck checks the state of the metatrans device 32 with a project-private ioctl request. After successfully repairing a file system, quotacheck will issue a project-private ioctl request that resets metatrans device 32's exception state.

The ufs_mount program may accept a pair of new options to control whether or not to use delayed directory updates.

Header files

<sys/fs/ufs_inode.h> struct ufsvfs may contain a pointer to struct metatrans to identify the metatrans device. i_doff is added to struct inode.

<sys/fs/ufs_quota.h> struct dquot may have the new field dq_doff.

<sys/fs/ufs_fs.h>

The new clean flag value FSLOG is defined here. fs_sparecon [53] is renamed fs-reclaim.

<sys/fs/ufs_trans.h>
<sys/md_trans.h>

These are new header files that define project-private interfaces, e.g., metatrans ioctl commands and data structures.

Kernel Interfaces common/fs/ufs/*.c

The VOP and VFS interfaces to UFS need not change unless a flag is added to the directory VOP calls to distinguish local and remote access. Calls to the metatrans logging interface are added to numerous internal UFS functions.

common/vm/page_lock.c

The following functions allow conditional access to a page: page_io_lock (), page_io_unlock (), page_io_trylock and page_io_assert ().

common/vm/vm_pvn.c

The following function allows release of the pages acquired using the preceding functions: pvn_io_done.

common/os/bio.c

A new function, trygetblk (), is added to bio.c. This function checks whether a buffer exists for the specified device and block number and is immediately available for writing. If these conditions are satisfied, it returns a pointer to the buffer header, or NULL if they are not.

Thread-specific data

TSD may be utilized for testing. Each delta 43 in a file system operation will be associated with the thread that is causing the delta 43.

UFS mount stores the value returned by ufs_trans_get () in the ufsvfs field vfs_trans. A NULL value means that the file system is not mounted from a metatrans device 32. UFS functions as usual in this case. A Non-NULL value means the file system is mounted from a metatrans device. In this case:

a) The on-disk clean flag is set to FSLOG and further clean flag processing is disabled by setting the in-core clean flag to FSBAD. Disabling clean flag processing saves CPU overhead.

b) The DIO flag is set unless the "nosyncdir" mount option is specified. Local directory updates will be recorded with a delayed write. A crash could lose these operations. Remote directory operations remain synchronous. Directory operations are considered remote when T_DONTPEND is set in curthread->t_flag.

c) An exception routine is registered with the metatrans device 32 at mount time. The metatrans drive calls this routine when an exception condition occurs. Exception conditions include device errors and detected inconsistencies in the driver's state. The UFS exception routine will begin a kernel thread that hard locks the affected file systems.

Each UFS Vnode or VFS operation may generate one or more transactions. Transactions may be nested, that it a transaction may contain subtransactions that are contained entirely within it. Nested transactions occur when an operation triggers other operations. Typically, each UFS operation has one transaction (plus any nested transactions) associated with it. However, certain operations such as VOP_WRITE and VFS_SYNC are divided into multiple transactions when a single transaction would exceed the total size of the logging device 46. Others such as VOP_CMP and VOP_ADDMAP, do not generate any transactions because they never change the file system state. Some operations that do not directly alter the file system may generate transactions as a result of side effects. For example, VOP_LOOKUP may replace an entry in the dnlc or inode cache, causing in-core inodes to become inactive and the pages associated with them to be written to disk.

Transactions begin with a call to TRANS_BEGIN (). The transaction terminates when TRANS_END is called. A transaction is composed of deltas 43, which are updates to the file system's metadata. Metadata is the superblock, summary information, cylinder groups, inodes, allocation blocks, and directories. UFS identifies the deltas 43 for the metatrans device 32 by calling TRANS_DELTA (). This call identifies a range of bytes within a buffer that should be logged. These bytes are logged when the buffer is written. UFS often alters the same metadata many times for a single operation. Separating the declaration of the delta 43 from the logging of the delta 43 collapses multiple updates into one delta 43.

UFS obtains disk blocks for user data and allocation blocks from the same free pool. As a result, user data may occupy locations on disk that contained metadata at some earlier time. The log design must ensure that during recovery, the user data is not incorrectly updated with deltas 43 to the former metadata. UFS prevents this by calling TRANS_CANCEL () whenever a block is allocated for user data.

Writes to the raw or block metatrans device 32 can invalidate information recorded in the log. To avoid inconsistencies, the driver transacts these writes.

The logging device 46 increases synchronous write performance by batching synchronous writes together and by writing the batched data to the logging device 46 sequentially. The data is written asynchronously to the master device 44 at the same time. The synchronous write data recorded in the log is not organized into transactions. The metatrans device 32 transparently logs synchronous write data without intervention at the file system level. Synchronously written user data is not logged when there is not sufficient free space in the log. In this case, an ordinary synchronous write to the master device 44 is done.

When synchronous write data is logged, any earlier log records for the same disk location must be canceled to avoid making incorrect changes to the data during recovery or roll-forward. When the asynchronous write of the data to the master device 44 has finished, the metatrans driver's done routine places a cancel record on a list of items to be logged. Subsequent synchronous writes to the same disk location are followed by a synchronous commit that flushes this record to the log and cancels the previous write. Subsequent asynchronous writes to the same location will disappear at reboot unless they are followed by a sync (), fsync () or further synchronous update. The correctness of this scheme depends on the fact that UFS will not start a new write to a disk location while a preceding one is still in progress.

The master device 44 is periodically updated with the committed changes in the log. Changes recorded at the head of the log are rolled first. Three performance measures reduce the overhead of rolling the log. First, the driver avoids reading the log when the required data is available, either in the buffer cache or in the page cache. Two new routines, trygetblk () and ufs_trypage (), return a buffer header or a page without sleeping or they return NULL. Second, overlapping deltas 43 are canceled. If the log contains multiple updates for the same data, only the minimum set required is read from the log and applied. The third measure involves the untransacted synchronous write data. This data is written synchronously to the logging device 46 and asynchronously to the master device 44. The roll logic simply waits for the asynchronous write to complete.

Rolling is initiated by the metatrans driver. When the logging device 46 fills, the metatrans driver immediately rolls the log in the context of the current thread. Otherwise, the metatrans driver heuristically determines when rolling would be efficient and it starts a kernel thread. An obvious heuristic for this case is when the metatrans driver has been idle for several seconds. The log is not rolled forward at fsync (), sync () or unmount but is rolled when the metatrans device 32 is cleared by the metaclear(1m) utility.

The metatrans device 32 puts itself into an exception state if an error occurs that may cause loss of data. In this state, the metatrans device 32 returns EIO on each read or write after calling all registered "callback-on-exception" routines for the device. UFS registers a callback on routine at mount time. The UFS routine starts a kernel thread that hard locks the affected UFS file systems, allowing manual recovery. The usual procedure is to unmount the file system, fix the error, and run fsck. Fsck takes the device out of the exception state after it repairs the file system. The file system can then be mounted, and the file system functions as normal. If the file system is unmounted and then mounted again without running fsck, any write to the device returns EIO but reads will proceed if the requested data can be accessed.

UFS must not exhaust log space and, if the metatrans driver cannot commit a transaction because of insufficient log space, it treats the condition as a fatal exception. UFS avoids this situation by splitting certain operations into multiple transactions when necessary. The UFS flush routines create a transaction for every ufs_syncip () or VOP_PUTPage call. The flush routines are ufs_flushi (), ufs_iflush (), and ufs_flush_icache (). The affected UFS operations are VFS_Sync and VFS_UNMOUNT and the UFS ioctls FIOLFS, FIOFFS, and FIODIO. A VOP_WRITE operation is split into multiple rwip () calls in ufs_write ().

Freeing a file in ufs iinactive () cannot be split into multiple transactions because of deadlock problems with transaction collisions and recursive UFS operations and freeing of the file is delayed until there is no chance of deadlock.

The metatrans driver does not recover the resources held by open, deleted files at boot. Instead, UFS manages this problem. A kernel thread created at mount time scans for deleted files if:

a) The file system is on a metatrans device 32, or b) The superblock says there are deleted files. A bit in a previously unused spare in the superblock indicates whether any such files are present.

The metatrans device 32 driver handles three classes of errors: "device errors", "database errors", and "internal errors". Device errors are errors in reading or writing the logging or master devices 46, 44. Database errors are errors reported by MDD's database routines. Internal errors are detected inconsistencies in internal structures, including structures written onto the logging device 46.

A mounted metatrans device 32 responds to errors in one of two ways. The metatrans driver passes errors that do not compromise data integrity up to the caller without any other action. For instance, this type of error can occur while reading unlogged data from the master device 44. The metatrans device 32 puts itself into an exception state whenever an error could result in lost or corrupted data, for example, an error reading or writing the logging device 46 or an error from MDD's database routines. A metatrans device 32 puts itself into an exception state by:

a) Recording the exception in MDD's database, when possible.

b) Calling any registered "callback-on-exception" routines. These routines are registered with the device at mount time. UFS registers a routine that starts a kernel thread that hard locks the affected UFS file systems. These file systems can be unmounted and then remounted after the exception condition has been corrected.

c) Returning EIO for every read or write call while the metatrans device 32 is mounted.

After the metatrans device 32 is released by UFS at unmount with uf s_trans_put (), reads return EIO when be the requested data cannot be accessed and writes always return EIO. This behavior persists even after the metatrans device 32 is mounted again.

When fsck repairs the file system, it takes the metatrans device 32 out of its exception state. Fsck first issues a project-private ioctl that rolls the log up to the first error and discards the rest of the log and makes the device writable. After repairing the file system fsck issues a project-private ioctl that takes the device out of its exception state. At boot time, the logging device 46 is scanned and the metatrans device 32's internal state is rebuilt. A device error during the scan puts the metatrans device 32 in the exception state. The scan continues if possible. An unreadable sector resulting from an interrupted write is repaired by rewriting it. The metatrans device 32 is not put into an exception state.

Roll forward operations may happen while scanning the logging device 46 and rebuilding the internal state. Roll forward operations happen because map memory may exceed its recommended allocation. Errors during these roll forward operations put the metatrans device 32 into an exception state and the scan continues if possible.

It is recognized that delayed recording of local directory updates can improve performance. Two mechanisms for differentiating local and remote (NFS) directory operations may be implemented: a) UFS can examine the p_as member of the proc structure (If it is null then the caller is a system process, presumably NFS; otherwise the operation has been initiated by a user-level process and is taken to be local); or b) add a new flag to the Vnode operations for directories that specifies whether or not the operation must be synchronous (or add a new flag to the thread structure).

Resources associated with open but deleted files must be reclaimed after a system crash and the present invention includes a kernel thread for this purpose. However, a thread that always searches the entire file system for such files has two disadvantages: the overhead of searching and the possibly noticeable delay until space is found and recovered. An alternative is to use a spare field in the superblock to optimize the case where there are no such files, which would likely be a fairly common occurrence.

The FIOSDIO ioctl puts the UFS file system into delayed IO mode, which means that local directory updates are written to disk with delayed writes. Remote directory updates remain synchronous, as required by the NFS protocol. This mode makes directory operations very fast but without the present invention it is unsafe and repairing a file system in DIO mode will usually require user intervention. The logging mechanism of the present invention ameliorates the danger. To improve directory update performance, file systems may be placed into delayed IO mode unless the "nosyncdir" mount option is specified. However, the implementation of delayed IO mode changes considerably and a solution is to avoid use of the FIOSDIO flag and instead use a different, specific flag. This specific flag might be administered by a new utility and a project-private UFS ioctl. The new flag could be stored in the superblock or could be stored in MDD's database. The FIOSDIO ioctl would then have no effect on a file system in accordance with the present invention.

UFS Interface to Metatrans Device

A metatrans device 32 records itself with UFS when the metatrans device 32 is created or is recreated at boot:

```
struct ufstrans*
    ufs_trans_set (
        dev_t dev,
        struct ufstransops *ops
        void *data)
``` dev is the metatrans device number, data is the address of a metatrans-private structure, ops is the address of the branch table:

```
struct ufstansops {
    int (*trans_begin) (struct ufstrans *, top_t,u_long, u_long) ;
    void (*tran_end) (struct ufstrans *, top_t, u_long, u_long) ;
    void (*trans_delta) (struct ufstrans *, off_t, off_t, delta_t,
        int (*) () , u_long) ;
    void (*trans_cancel) (struct ufstrans *, off_t, off_t,
        delta_t) ;
    int (*trans_log) (struct ufstrans *, char *, off_t, off_t) ;
    void (*trans_mount) (struct ufstrans *, struct fs *) ;
    void (*trans_unmount) (struct ufstrans *, struct fs *) ;
    void (*trans_remount) (struct ufstrans *, struct fs *) ;
    void (*trans_iget) (struct ufstrans *, struct inode *) ;
    void (*trans_free_iblk) (struct ufstrans *, struct inode *,
        daddr_t) ;
    void (*trans_free) (struct ufstrans *, struct inode *, daddr_t,
        u_long) ;
    void (*trans_alloc) (struct ufstrans *, struct inode *, daddr_t;
        u_long,
int) ;
} ;
``` ufs_trans_set stores the above information in a singly linked list of:

```
struct ufstrans {
    struct ufstrans    *ut_next    /* next item in list*/
    dev_t              ut_dev;     /* metatrans device no. */
    struct ufstransops *ut_ops;    /* metatrans ops */
    struct vfs         *ut_vfsp;   /* XXX for inode pushes */
    void               *ut_data;   /* private data (?) */
    void               (*ut_onerror) () ;/* callback ufs on error */
    int                ut_onerror_state; /* fs specific state
} ;
``` ufs_trans_reset () unlinks and frees the ufstrans structure. ufs_trans_reset () is called when a metatrans device is cleared.

At mount time, UFS stores the address of a ufstrans structure in the vfs_trans field of a struct ufsvfs:

```
ufsvfsp->vfs_trans = ufs_trans_get (dev, vfsp,
    ufs_trans_onerror, ufs_trans_onerror_state) ;
```

Ifuf s_trans_get returns NULL when the file system is not on a metatrans device 32, ufs_trans_onerror is called by the metatrans device 32 when a fatal device error occurs. ufs_trans_onerror_state is stored as part of the metatrans device 32's error state. This error state is queried and reset by fsck and quotacheck.

UFS calls the metatrans device via the ufstransops table. These calls are buried inside of the following macros:

```
/*
 * vfs_trans == NULL means no metatrans device
 /*
#define TRANS_ISTRANS(ufsvfsp) (ufsvfsp->vfs_trans)
/*
 * begin a transaction
 /*
#define TRANS_BEGIN(ufsvfsp, vid, vsize, flag)
    ((TRANS_ISTRANS (ufsvfsp))?
    (*ufsvfsp->vfs_trans->ut_ops->trans_begin)
    (ufsvfsp->vfs_trans, vid, vsize, flag) : 0)
/*
 * end a transaction
 /*
#define TRANS_END(ufsvfsp, vid, vsize, flag)
    if (TRANS_ISTRANS(ufsvfsp))
        (*ufsvfsp->vfs_trans->ut_ops->trans_end)
            (ufsvfsp->vfs_trans, vid, vsize, flag)
/*
*record a delta
/*
#define TRANS_DELTA(ufsvfsp, mof, nb, dtyp, func, arg)
    if (TRANS_ISTRANS(ufsvfsp))
        (*ufsvfsp->vfs_trans->ut_ops->trans_delta)
            (ufsvfsp->vfs_trans, mof, nb, dtyp, func, arg)
/*
*cancel a delta
/*
#define TRANS_CANCEL(ufsvfsp, mof, nb, dtyp)
    if (TRANS_ISTRANS(ufsvfsp))
        (*ufsvfsp->vfs_trans->ut_ops->trans_cancel)
            (ufsvfsp->vfs_trans, mof, nb, dtyp)
/*
 * log a delta
 /*
#define TRANS_LOG(ufsvfsp, va, mof, nb)
    if (TRANS_ISTRANS(ufsvfsp))
        (*usfsvfsp->vfs_trans->ut_ops->trans_log)
            (ufsvfsp->vfs_trans, va, mof, nb)
/*
 * The following macros provide a more readable interface to
TRANS_DELTA
/*
#define TRANS_BUF(ufsvfsp, vof, nb, bp, type)
    TRANS_DELTA(ufsvfsp,
        dbtob(bp->b_blkno) + vof, nb, type,
        ufs_trans_push_buf, bp->b_blkno)
#define  TRANS_BUF_ITEM (ufsvfsp, item, base, bp, type)
    TRANS_DELTA(ufsvfsp, (caddr_t)&(item) - (caddr_t)
        (base), sifeof (item), bp, type)
#define  TRANS_INODE(ufsvfsp, vof, nb, ip)
    TRANS_DELTA(ufsvfsp, ip->i_doff +vof,
        nb, DT_INODE, ufs_trans_push_inode, ip
#define  TRANS_INODE_ITEM(ufsvfsp, item, ip)
    TRANS_INODE(ufsvfsp, (caddr_t)&(item) - (caddr_t)&ip->
        i_ic, sizeof (item), ip)
#define  TRANS_SI(ufsvfsp, fs, cg)
    TRANS_DELTA(ufsvfsp,
        dbtob(fsbtodb(fs, fs->fs_csaddr)) +
        (caddr_t)&fs->fs_cs(fs, cg) - (cadr_t)fs->fs_csp[0],
        sizeof (struct csum), DT_SI, ufs_trans_push_si, cg)
```

17
-continued

```
#define TRANS_SB(ufsvfsp, item, fs)
        TRANS_DELTA(ufsvfsp,
            dbtob(SBLOCK) + ((caddr_t)&(item) - (caddr_t)fs),
            sizeof (item), DT_SB, ufs_trans_push_sb, 0)
/*
 * These functions "wrap" functions that are not VDP or VFS
 * entry points but must still use the TRANS_BEGIN/
   TRANS_END protocol
/*
#define TRANS_SBUPDATE(ufsvfsp, vfsp, topid)
        ufs_trans_sbupdate(ufsvfsp vfsp, topid)
#define TRANS_SYNCIP(ip, bflags, iflag, topid)
        ufs_trans_syncip(ip, bflags, iflag, topid)
#define     TRANS_SBWRITE(ufsvfsp, topid)
        fs_trans_sbwrite(ufsvfsp, topid)
#define TRANS_IUPDAT(ip, waitfor) ufs_trans_iupdat(ip, waitfor)
#define TRANS_PUTPAGES(vp, off, len, flags, cred)
        ufs_trans_putpages(vp, off, len, flags, cred)
/*
*Test/Debug ops
*The following ops maintain the metadata map.
#define TRANS_IGET(ufsvfsp, ip)
        if (TRANS_ISTRANS (ufsvfsp)
            (*ufsvfsp->vfs_trans->ut_ops->trans_iget)
                (ufsvfsp->vfs_trans, ip, bno, size)
#define TRANS_FREE_IBLK(ufsvfsp, ip, bn)
        if TRANS_ISTRANS(ufsvfsp))
            (*ufsvfsp->vfs_trans->ut_ops->trans_free_iblk)
                (ufsvfsp->vfs_trans, ip, bn)
#define TRANS_ISTRANS(ufsvfsp, ip, bno, size)
        if TRANS_ISTRANS(ufsvfsp))
            (*ufsvfsp->vfs_trans->ut_ops->trans_free)
                (ufsvfsp->vfs_trans, ip, bno, size)
#define TRANS_ALLOC(ufsvfsp, ip, bno, size, zero)
        if (TRANS_ISTRANS(ufsvfsp))
            (*ufsvfsp->vfs_trans->ut_ops->trans_alloc)
                (ufsvfsp->vfs_trans, ip, bno, size, zero)
#define TRANS_MOUNT(ufsvfsp, fsp)
        if (TRANS_ISTRANS(ufsvfsp))
            (*ufsvfsp->vfs_trans->ut_ops->trans_mount)
                (ufsvfsp->vfs_trans, fsp)
#define TRANS_UMOUNT(ufsvfsp, fsp)
        if (TRANS_ISTRANS (ufsvfsp))
            (*ufsvfsp->vfs_trans->ut_ops->trans_umount)
                (ufsvfsp->vfs_trans, fsp)
#define TRANS_REMOUNT(ufsvfsp, fsp)
        if TRANS_ISTRANS(ufsvfsp))
            (*ufsvfsp->vfs_trans->ut_ops->trans_remount)
                (ufsvfsp->vfs_trans, fsp)
```

Besides the vfs_trans field in the ufsvfs struct, a new field, off_t i_doff, is added to the *incore* inode, struct inode. i_doff is set in ufs_iget (). i_doff is the device offset for the inode's dinode. i_doff reduces the amount of code for the TRANS_INODE() and TRANS_INODE_ITEM() macros.

Similarly, the field dq_doff is added to the "inocre" quota structure, struct dquot.

The protocol between ufs_iinactive() and ufs_iget () is changed because the system deadlocks if an operation on fs A causes a transaction on fs B.

This happens in ufs_iinactive when it frees an inode or when it calls ufs_syncip (). This happens in ufs_iget () when it calls ufs_syncip () on an inode from the free list. In the implementation of the present invention, a thread cleans and moves idle inodes from its idle queue to a new 'really-free' list. The inodes on the 'really-free' list are truly free and contain no state. In fact, they are merely portions of memory that happen to be the right size for an inode. ufs_iget () uses inodes off this list or kmem_alloco()'s new inodes.

The thread runs when the number of inodes on its queue exceeds 25% of ufs_ninode. ufs_ninode A is the user-suggested maximum number of inodes in the inode cache. Note that ufs_ninode does not limit the size of the inode cache. The number of active inodes and the number of idle inodes with pages may remain unbounded. The thread will clean inodes until its queue length is less than 12.5% of ufs_ninode. Some new counters may be added to inode stats structure:

```
/* Statistics on inodes */
struct instats {
    int in_hits;                  /* Cache hits */
    int in_misses;                /* Cache misses */
    int in_malloc;                /* kmem_allocated */
    int in_mfree;                 /* kmem_free'd */
    int in_maxsize;               /* Largest size reached by cache */
    int in_frfront;               /* put at front of freelist */
    int in_frback;                /* put at back of freelist */
    int in_dnlclook;              /* examined in dnlc */
    int in_dnlcpurge;             /* purged from dnlc */
    int in_inactive;              /* inactive calls */
    int in_inactive_nop;          /* inactive calls that nop'ed */
    int in_inactive_null;         /* inactive calls with null vfsp */
    int in_inactive_delay_free;   /* inactive delayed free's */
    int in_inactive_free;         /* inactive q's to free thread */
    int in_inactive_idle;         /* inactive q's to idle thread */
    int in_inactive_wakeups;      /* wakeups */
    int in_scan;                  /* calls to scan */
    int in_scan_scan;             /* inodes found */
    int in_scan_rwfail;           /* inode rw_tryenter's that failed*/
``` ufs_iinactive frees the ondisk resources held by deleted files. Freeing inodes in ufs_iinactive () can deadlock be system as above-described and the same solution may be used, that is, deleted files are processed by a thread. The thread's queue is limited to ufs_ninode entries. ufs_rmdiro and ufs_remove() enforce the limit.

The system deadlocks if a thread holds the inode cache's lock when it is suspended while entering a transaction. A thread suspends entering a transaction if there isn't sufficient log space at that time. The inode scan functions ufs_flushi, ufs_iflush, and ufs_flush inodes use a single scan-inode-hash function that doesn't hold the inode cache lock:

```
*/
 * scan the hash of inodes and call func with the inode locked
*/
int
ufs_scan_inodes(int rwtry, int (*func) (struct inode *, void*),   void
                                                                  *arg
                                                                  )
{
    struct inode *ip, *lip;
    struct vnode *vp;
    union ihead *ih;
    int      error;
    int      saverror = 0;
    extern krwlock_t icache_lock;
    ins.in_scan++;
    rw_enter(&icache_lock, RW_READER);
    for (ih = ihead; ih < &ihead[INOHSZ]; ih++) {
        for (ip =ih->ih_chain[0], lip = NULL;
            ip ! = (struct inode *)ih;
            ip = lip->i_forw)
    ins.in_scan_scan++;
    vp = ITOV(ip);
    VN_HOLD(vp);
    rw_exit(&icache_lock)
    if (lip)
        VN_RELE (ITOV(lip));
    lip = ip;
/*
 * Acquire the contents lock to make sure that the
 * inode has been initialized in the cache.
/*
if (rwtry)
    if (!rw_tryenter(&ip->i_contents RW_WRITER))
        ins.in_scan_rwfail++;
        rw_enter(&icache_lock, RW_READER);
```

-continued

```
            continue;
       }
}    else
       rw_enter(&ip->i_contants, RW_WRITER);
rw_exit(&ip->i_contents)
*/
* i_number == 0 means bad initialization; ignore
*/
if (ip->i_number)
    if (error = (*func) (ip, arg))
        severror = error;
rw_enter(&icache_lock, RW_READER);
}
if (lip) {
    rw_exist(&icache_lock);
    VN_RELE (ITOV(lip));
    rw_enter(&icache_lock, RW, READER);
    }
}
rw_exit(&icache_lock);
return (saverror)
``` ufs_iget uses the same protocol. This protocol is possible because the new iget/iinactive protocol obviates the problems inherent in attempting to reuse a cached inode.

The lockfs flush routine, ufs_flush inodes, is altered to effectuate the present invention. ufs_flush-inodes hides inodes while flushing them.

The inodes are hidden by taking them out of the inode cache, flushing them, and then putting them back into the cache. However, hidden inodes cannot be found at the end of transactions. ufs_flush_inodes now uses the new inode hash scan function to flush inodes.

ufs_unmounto is modified to use the lockfs protocol and the new inode hash scan function. ufs-unmount also manages the UFS threads. All of the threads are created, controlled, and destroyed by a common set of routines in ufs_thread.c. Each thread is represented by the structure:

```
*/
*/ each ufs thread is managed by this struct (ufs_thread.c)
*/
struct ufs_q {
    void      *uq_head;     /* first entry on q */
    void      *uq_tail;     /* last entry on q */
    long      uq_ne;        /* # of entries */
    long      uq_maxne;     /* thread runs when ne==maxne */
    u_short   uq_nt;        /* # of threads serving this q */
    u_short   uq_nf;        /* # of flushes requested */
    u_short   uq_flags;     /* flags */
    kcondvar_t uq_cv;       /* for sleep/wakeup */
    kmutex_t  uq_mutex;     /* protects this struct */
};
```

With reference additionally to the following pseudocode listing, the transaction device driver for a journaling file system to ensure atomicity of write operations to a computer mass storage device in the event of system failure may be further understood:

```
FILE SYSTEM OPERATION:
    Inform transaction device that operation is beginning
    Perform usual file system operations
    Alter important data ---> Inform transaction device
    .
    .
    Alter important data ---> Inform transaction device
    .
    .
```

-continued

```
    Inform transaction device that operation has ended
TRANSACTION DEVICE - BEGIN OPERATION:
    Assign transaction ID
    Return
TRANSACTION DEVICE - END OPERATION:
    Commit transaction to log
    Return
TRANSACTION DEVICE - IMPORTANT DATA NOTIFICATION:
    Record disk location of important data
    Return
TRANSACTION DEVICE - NORMAL DISK WRITE:
    If data contains important data changes
        copy altered data to log buffer
        Return
    Else
        start writing data to disk
        Return
TRANSACTION DEVICE - NORMAL DISK READ:
    Read data from disk into buffer
    If log contains update for this data
        Read updates from log
        Apply updates to buffer
    Return
```

While there have been described above the principles of the present invention in conjunction with specific computer operating systems, the foregoing description is made only by way of example and not as a limitation to the scope of the invention.

What is claimed is:

1. A method for ensuring atomicity of data written to a computer mass storage device in conjunction with a computer operating system for use with a Unix file system (UFS), said method comprising the steps of:

providing for designating a beginning of a file system operation to a transaction device, wherein said transaction device comprises two disk devices including a master and a log device;

providing for making an incore copy of file system data from said master device;

providing for performing said file system operation by altering said incore copy of said file system data;

providing for informing said transaction device of selected characteristics of said altered data;

providing for declaring an end of said file system operation to said transaction device;

providing for committing said altered data corresponding with said file system operation to a log on said log device; and providing for writing said altered data from said log to said master device.

2. The method of claim 1 wherein said step of providing for designating comprises the steps of:

assigning an identification number to said file system operation; and informing said transaction device of said identification number.

3. The method of claim 1 wherein said step of providing for performing comprises making a plurality of alterations to said incore copy of said file system data.

4. The method of claim 1 wherein said step of providing for informing is carried out by determining an offset and size of said altered data.

5. The method of claim 1 further comprising the step of:

providing for analyzing said altered data to determine importance thereof to said file system; and providing for directly writing said altered data to said master device if said altered data is not important to said file system.

6. The method of claim 1 further comprising the steps of:
   providing for requesting reading data from said transaction device;
   providing for reading data from said master device in response to said request using said transaction device;
   providing for writing said read data to a buffer corresponding with said log;
   providing for determining if said log contains updates for said read data;
   providing for updating said read data in said buffer if said log contains updates for said read data; and
   providing for supplying said updated read data from said buffer to satisfy said step of requesting.

7. A computer program product comprising:
   a computer usable medium having computer readable code embodied therein for ensuring atomicity of data written to a computer mass storage device in response to file system operation of a computer operating system having a file system (FS) layer, the computer program product comprising:
   computer readable program code devices configured to cause a computer to effect designating a beginning of a file system operation to a transaction device via the FS layer, wherein said transaction device comprises a master disk device and a log disk device;
   computer readable program code devices configured to cause a computer to make an incore copy of file system data from said master disk device;
   computer readable program code devices configured to cause a computer to effect performing said file system operation by altering said incore copy of said file system data;
   computer readable program code devices configured to cause a computer to effect informing said transaction device of selected characteristics of said altered data;
   computer readable program code devices configured to cause a computer to effect declaring an end of said file system operation to said transaction device;
   computer readable program code devices configured to cause a computer to effect committing said altered data corresponding with said file system operation to a log on said log disk device; and
   computer readable program code devices configured to cause a computer to effect writing said altered data from said log disk device to said master disk device.

8. The computer program product of claim 7 wherein said computer readable program code devices configured to cause a computer to effect designating is carried out by computer readable program code devices configured to cause a computer to assign an identification number to said file system operation.

9. The computer program product of claim 7 wherein said computer readable program code devices configured to cause a computer to effect performing is carried out by computer readable program code devices configured to cause a computer to iteratively effect altering said incore copy of said file system data.

10. The computer program product of claim 7 wherein said computer readable program code devices configured to cause a computer to effect informing is carried out by computer readable program code devices configured to cause a computer to effect determining an offset and size of said altered data.

11. The computer program product of claim 7 further comprising:
   computer readable program code devices configured to cause a computer to effect analyzing said altered file system data to determine importance thereof to said file system; and
   computer readable program code devices configured to cause a computer to effect directly writing said altered data to said master disk device if said altered data is not important to said file system.

12. The computer program product of claim 7 further comprising:
   computer readable program code devices configured to cause a computer to effect requesting reading data from said transaction device;
   computer readable program code devices configured to cause a computer to respond to said requesting by reading data from said master disk device using said transaction device;
   computer readable program code devices configured to cause a computer to effect writing said read data to a buffer corresponding with said log;
   computer readable program code devices configured to cause a computer to effect determining if said log contains updates for said read data; computer readable program code devices configured to cause a computer to effect updating said read data in said buffer if said log contains updates for said read data; and
   computer readable program code devices configured to cause a computer to supply said updated read data from said buffer to satisfy said requesting reading.

13. A computer including a computer operating system loadable thereon for running application programs, a computer mass storage device corresponding with said computer for receiving data in response to a file system layer of said operating system, wherein said operating system comprises:
   a metatrans device including a log device and a corresponding buffer, said metatrans device coupling the file system layer of said operating system layer to a disk driver of said computer mass storage device, said metatrans device for constructing a record in said log device containing updated transaction data received from said file system layer, whereupon said metatrans device writes said updated transaction data to said computer mass storage device if said updated transaction data is in said buffer.

14. A computer including a computer operating system loadable thereon for running application programs, a computer mass storage device corresponding with said computer for receiving data in response to a file system layer of said operating system, said operating system comprising:
   a metatrans device including a log device and a corresponding buffer, said metatrans device coupling the file system layer of said operating system layer to a disk driver of said computer mass storage device, said metatrans device for constructing a record in said log device containing updated transaction data received from said file system layer, whereupon said metatrans device writes said updated transaction data to said computer mass storage device if said updated transaction data is in said buffer; and
   a delta map corresponding with said log device and corresponding buffer of said metatrans device, whereupon said metatrans device reads original data from said computer mass storage device into said buffer and applies differences between said original data and said transaction data from said delta map to update said transaction data in said buffer prior to writing said updated data back to said computer mass storage device.

* * * * *